(12) United States Patent
Broas et al.

(10) Patent No.: US 12,328,237 B2
(45) Date of Patent: Jun. 10, 2025

(54) USING VIRTUAL NON-UNIFORM MEMORY ACCESS NODES TO FUNNEL VIRTUAL MACHINE MEMORY ACCESSES

(71) Applicant: Microsoft Technology Licensing, LLC, Redmond, WA (US)

(72) Inventors: Kevin Michael Broas, Kirkland, WA (US); Yevgeniy M. Bak, Redmond, WA (US); Lisa Ru-feng Hsu, Durham, NC (US); Daniel Sebastian Berger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 49 days.

(21) Appl. No.: 18/075,348

(22) Filed: Dec. 5, 2022

(65) Prior Publication Data
US 2024/0187316 A1 Jun. 6, 2024

(51) Int. Cl.
*G06F 9/455* (2018.01)
*H04L 41/5009* (2022.01)

(52) U.S. Cl.
CPC ...... *H04L 41/5009* (2013.01); *G06F 9/45558* (2013.01); *G06F 2009/45575* (2013.01); *G06F 2009/45583* (2013.01)

(58) Field of Classification Search
CPC ....... G06F 9/45558; G06F 2009/45575; G06F 2009/45583
USPC .......................................................... 711/170
See application file for complete search history.

(56) References Cited

U.S. PATENT DOCUMENTS

| 11,455,239 | B1 | 9/2022 | Shah | |
|---|---|---|---|---|
| 2022/0197811 | A1* | 6/2022 | Ganguly | .............. G06F 12/0862 |
| 2022/0214825 | A1* | 7/2022 | Ganguly | ............... G06F 3/0647 |
| 2024/0143362 | A1* | 5/2024 | Tsirkin | ................ G06F 9/45558 |

OTHER PUBLICATIONS

International Search Report and Written Opinion received for PCT Application No. PCT/US23/036825, mailed on Feb. 12, 2024, 15 pages.
Li, et al., "Pond: CXL-Based Memory Pooling Systems for Cloud Platforms", ARXIV Cornell University Library, Oct. 22, 2022, 15 pages.
Maruf, et al., "TPP: Transparent Page Placement for CXL—Enabled Tiered Memory", ARXIV Cornell University Library, Jun. 6, 2022, 16 pages.

\* cited by examiner

*Primary Examiner* — Christopher B Shin
(74) *Attorney, Agent, or Firm* — Workman Nydegger (57) ABSTRACT

A device calculates a memory oversubscription threshold for a virtual machine (VM). Based on the memory oversubscription threshold, the device determines a first memory size to be physically allocated to the VM, and a second memory size to be oversubscribed to the VM. The device configures a first virtual non-uniform memory access (NUMA) node comprising a virtual processor and a first virtual memory having the first memory size. The device allocates a first physical memory to back the first virtual memory. The device configures a second virtual NUMA node comprising a second virtual memory having the second memory size. The second virtual NUMA node is a computeless NUMA node. The device configures the VM to use the first virtual NUMA node and the second virtual NUMA node. Based on the second virtual NUMA node being computeless, the VM funnels a memory access to the first virtual memory.

20 Claims, 3 Drawing Sheets

USING VIRTUAL NON-UNIFORM MEMORY ACCESS NODES TO FUNNEL VIRTUAL MACHINE MEMORY ACCESSES

BACKGROUND

In conventional multiprocessor computer systems, a single main memory serves a plurality of processors. This can lead to performance bottlenecks in which individual processors may have to stall while waiting for data to arrive from main memory. To help alleviate these performance bottlenecks, a computer memory design known as non-uniform memory access (NUMA) provides separate memory for each processor (or group of processors). In NUMA architectures, memory access time often depends on the accessed memory location relative to the processor making the access. This is because a processor can access its own "local" memory faster than non-local memory (e.g., memory local to another processor, or memory shared between processors).

Additionally, hypervisor-based virtualization technologies allocate portions of a computer system's physical resources (e.g., processing units, physical memory regions, storage resources) into separate partitions, and execute software within each of those partitions. Hypervisor-based virtualization technologies therefore facilitate creation of virtual machines (VMs) that each executes guest software, such as an operating system (OS) and other software executing therein. A computer system that hosts VMs is commonly called a VM host node. While hypervisor-based virtualization technologies can take a variety forms, many use an architecture comprising a hypervisor that has direct access to hardware and that operates in a separate execution environment than all other software in the system, a host partition that executes a host OS and host virtualization stack, and one or more guest partitions corresponding to VMs. The host virtualization stack within the host partition manages guest partitions, and thus the hypervisor grants the host partition a greater level of access to the hypervisor, and to hardware resources, than it does to guest partitions.

When an underlying VM host node implements a NUMA memory design, some hypervisors can present this NUMA memory design to a VM by creating virtual NUMA nodes mirroring the underlying hardware, and assigning those virtual NUMA nodes to the guest partition of a given VM. For example, if the underlying hardware of a VM host node comprises distinct portions of memory for different processors (or different groups of processors), a hypervisor may create one or more virtual NUMA nodes, representing one of those distinct portions of memory (or a subset thereof) and a corresponding processor (or processors), and assign the virtual NUMA node(s) to the guest partition of a given VM.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to a method, implemented at a computer system that includes a processor, including: calculating a memory oversubscription threshold for a virtual machine (VM); based on the memory oversubscription threshold, determining (1) a first memory size to be physically allocated to the VM, and (2) a second memory size to be oversubscribed to the VM; configuring a first virtual non-uniform memory access (NUMA) node including a virtual processor (VP) and a first virtual memory having the first memory size, the configuring the first virtual NUMA node including allocating a first physical memory to back the first virtual memory; configuring a second virtual NUMA node including a second virtual memory having the second memory size, the second virtual NUMA node being a computeless NUMA node; and configuring the VM to use the first virtual NUMA node and the second virtual NUMA node.

In some aspects, the techniques described herein relate to a computer system, including: a processing system; and a computer storage media that stores computer-executable instructions that are executable by the processing system to at least: calculate a memory oversubscription threshold for a VM; based on the memory oversubscription threshold, determine (1) a first memory size to be physically allocated to the VM, and (2) a second memory size to be oversubscribed to the VM; configure a first virtual NUMA node including a VP and a first virtual memory having the first memory size, the configuring the first virtual NUMA node including allocating a first physical memory to back the first virtual memory; configure a second virtual NUMA node including a second virtual memory having the second memory size, the second virtual NUMA node being a computeless NUMA node; and configure the VM to use the first virtual NUMA node and the second virtual NUMA node.

In some aspects, the techniques described herein relate to a computer program product including a hardware storage device that stores computer-executable instructions that are executable by a processing system to at least: calculate a memory oversubscription threshold for a VM; based on the memory oversubscription threshold, determine (1) a first memory size to be physically allocated to the VM, and (2) a second memory size to be oversubscribed to the VM; configure a first virtual NUMA node including a VP and a first virtual memory having the first memory size, the configuring the first virtual NUMA node including allocating a first physical memory to back the first virtual memory; configure a second virtual NUMA node including a second virtual memory having the second memory size, the second virtual NUMA node being a computeless NUMA node that lacks any VP; and configure the VM to use the first virtual NUMA node and the second virtual NUMA node.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

A significant resource management challenge in operating virtual machine (VM) host nodes (e.g., server computing devices configured as VM hosts) is managing the allocation of physical VM host node memory to guest partitions (e.g., the VMs operating thereon). Recognizing that VMs may not actually use as much memory at any one point as they are assigned, many VM host administrators oversubscribe memory to VMs. For example, a VM may be assigned 8 gibibytes (GiB) of memory, giving the VM an 8 GiB guest-physical address (GPA) space. However, predicting that the VM would typically only use 50% (4 GiB) of that memory at any given time, a VM host administrator may "oversubscribe" 4 GiB of the VM's memory. This means that a VM host node maps 4 GiB of memory from a host memory address space to the VM's GPA space (e.g., using mappings between host virtual memory pages and guest physical memory pages), while leaving the other 4 GiB of the VM's GPA space unmapped. If the VM accesses a GPA corresponding to mapped host memory, that access can proceed directly (e.g., without a memory fault to establish a host-to-guest memory mapping). However, if the VM accesses a GPA without host memory mapped thereto, that access causes a costly (e.g., in terms of processor cycles) memory fault that traps to a host operating system (OS) for establishment of a host-to-guest memory mapping.

A challenge with VM memory oversubscription is that a guest OS operating at a VM is not aware of which memory accesses may result in a costly memory fault. One solution to this challenge is to "enlighten" the guest OS, so that the guest OS actively cooperates in the memory oversubscription model, and funnels its memory accesses to GPAs that are mapped to host memory whenever possible. However, a VM host administrator often has little control of the VMs being hosted (and the guest OSs operating therein), because those VMs are managed by tenants (e.g., customers) rather than the VM host administrator. Additionally, even if enlightened guest OSs are made available to tenants, those tenants may be unwilling or unable to use those enlightened guest OSs (e.g., due to challenges around compatibility, certification, stability, and the like).

The embodiments described herein use a virtualized non-uniform memory access (NUMA) topology to overcome challenges with VM memory oversubscription, among other things. In particular, these embodiments present a topology of virtual NUMA nodes to a VM in order to influence, or funnel, memory accesses by an unenlightened guest OS operating therein towards "preferred" GPAs (and away from "less preferred" GPAs). In embodiments, using virtual NUMA nodes to influence, or funnel, memory accesses is based on presenting at least two types of virtual NUMA nodes to a VM: (1) a traditional virtual NUMA node that includes both a compute (e.g., processor) resource and a memory resource, and (2) a new type of "computeless" virtual NUMA node that includes a memory resource but which lacks any compute resource.

In the description herein, the term "vNUMA" node refers to a traditional virtual NUMA node that includes both a compute and a memory resource, while the term zero-processor virtual NUMA (zNUMA) node refers to this new type of virtual NUMA node that includes a memory resource but which lacks any compute resource.

When presented a NUMA topology comprising vNUMA node(s) and zNUMA node(s), most guest OSs will prefer to send memory accesses to the vNUMA node(s) over the zNUMA node(s), because they see the vNUMA node(s) as comprising local memory, while they see the zNUMA node(s) as comprising remote memory. Thus, by mapping "preferred" GPAs into one or more vNUMA nodes, and by mapping "less preferred" GPAs into one or more zNUMA nodes, the embodiments described herein cause an unenlightened guest OS to funnel memory accesses to the "preferred" GPAs in favor of the "less preferred" GPAs.

Thus, the embodiments described herein provide for VM memory oversubscription for VMs running unenlightened guest OSs, in a manner that helps avoid costly memory faults that occur when accessing GPAs corresponding to oversubscribed memory. The embodiments described herein therefore improve management of VM host node resources through VM memory oversubscription techniques, even in the presence of "legacy" VMs that do not cooperate in a memory oversubscription model. This leads to more efficient use of VM host memory, and improves the performance of VMs hosted thereon.

In some embodiments, "preferred" GPAs are those GPAs that the VM host node has already mapped to physical memory, while "less preferred" GPAs are those GPAs that the VM host node has not already mapped to physical memory. Additionally, or alternatively, in embodiments, "preferred" GPAs are those GPAs that correspond to (e.g., the VM host node has mapped to, or could map to) a preferred physical memory resource type, while "less preferred" GPAs are those GPAs that correspond to (e.g., the VM host node has mapped to, or could map to) a less preferred memory resource type. Combinations of the foregoing are also possible. In embodiments, a preferred physical memory resource type includes host node-local memory, higher-bandwidth and/or lower-latency memory types such as Peripheral Component Interconnect Express (PCIe)-attached memory, and the like. In embodiments, a less preferred physical memory resource type includes host node-remote memory, lower-bandwidth and/or higher-latency memory types such as Compute Express Link (CXL)-attached memory, and the like.

Figure 1:
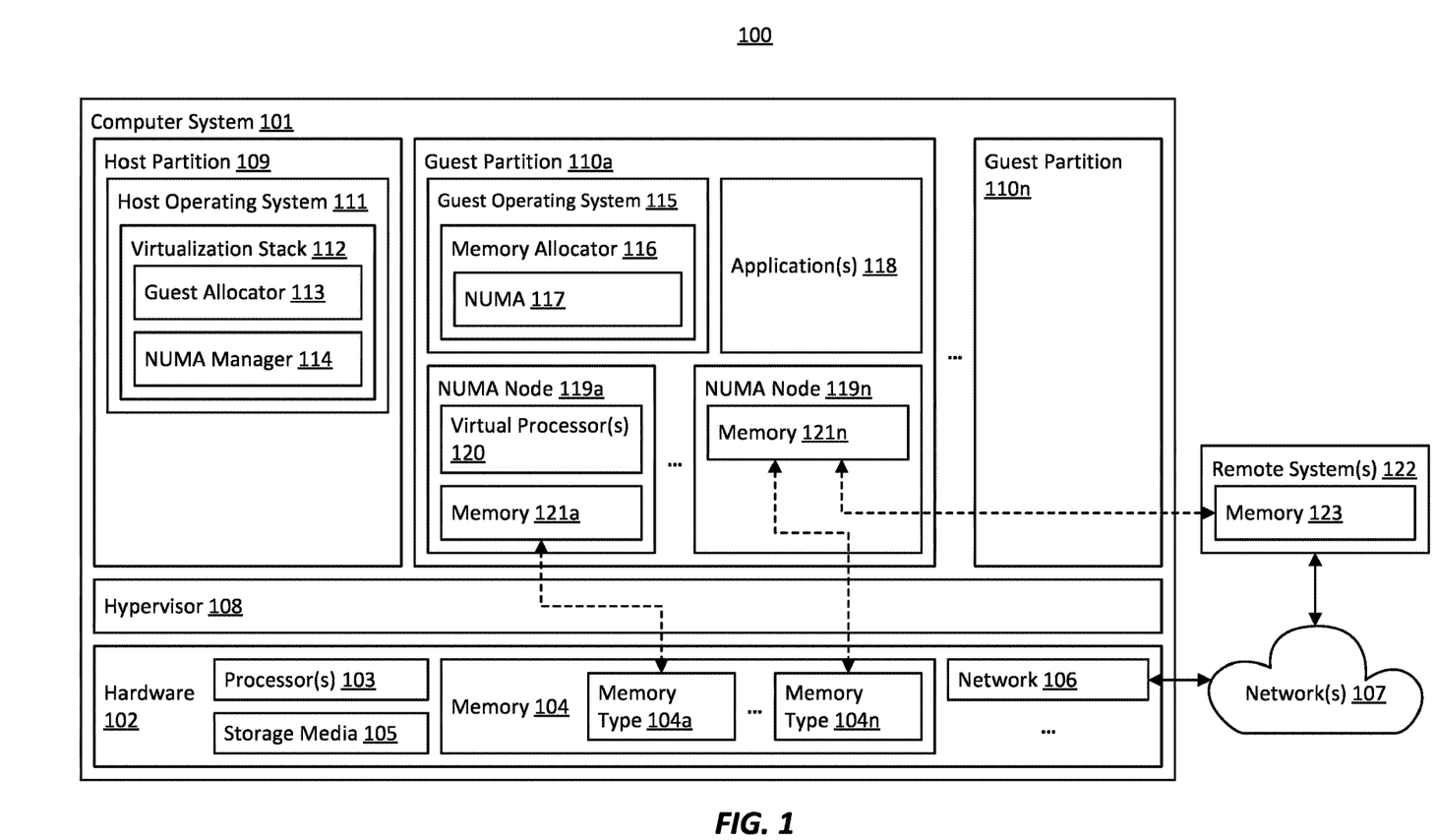
FIG. 1 illustrates an example computer architecture that facilitates using virtual non-uniform memory access (NUMA) nodes to funnel virtual machine (VM) memory accesses.

FIG. 1 illustrates an example computer architecture 100 that facilitates using virtual NUMA nodes to funnel VM memory accesses. In embodiments, computer architecture 100 encourages a guest OS operating in a VM to funnel memory accesses to preferred GPAs (e.g., physically-backed memory), and away from less preferred GPAs (e.g., oversubscribed memory). As shown, computer architecture 100 includes a computer system 101 comprising hardware 102. Examples of hardware 102 include a processing system comprising processor(s) 103 (e.g., a single processor, or a plurality of processors), memory 104 (e.g., system or main memory), a storage media 105 (e.g., a single computer-readable storage medium, or a plurality of computer-readable storage media), and a network interface 106 (e.g., one or more network interface cards) for interconnecting to remote computer system(s) 122 via network(s) 107. Although not shown, hardware 102 may also include other hardware devices, such as a trusted platform module (TPM)

for facilitating measured boot features, a video display interface, a user input interface, an external bus, and the like.

As shown, in computer architecture 100, a hypervisor 108 executes directly on hardware 102. In general, hypervisor 108 partitions hardware resources (e.g., processor(s) 103, memory 104, I/O resources) among a host partition 109 within which a host OS 111 executes, as well as one or more guest partitions (e.g., guest partition 110a to guest partition 110n). A guest OS and other software executes within the context of each guest partition, such as guest OS 115 and application(s) 118 which execute within the context of guest partition 110a. In the description herein, the term "VM" is used to refer to a guest partition and the software executing therein.

In computer architecture 100, host OS 111 is illustrated as including a virtualization stack 112, which manages VMs hosted by computer system 101 (e.g., VM memory management, VM lifecycle management, device virtualization) via one or more application program interface (API) calls to hypervisor 108. In FIG. 1, virtualization stack 112 is illustrated as including a guest allocator 113 and a NUMA manager 114. In embodiments, guest allocator 113 represents functionality for allocating physical resources (e.g., from hardware 102, from system(s) 122) to guest partitions. In embodiments, NUMA manager 114 represents functionality for creating virtual NUMA nodes, including vNUMA nodes and zNUMA nodes. Although guest allocator 113 and NUMA manager 114 are illustrated as being part of virtualization stack 112, in various embodiments one or more of these components may be part of host OS 111, itself, or part of a management computer system (e.g., which manages a plurality of VM host nodes, including computer system 101). Notably, embodiments can operate both in environments in which hardware 102 comprises a physical NUMA topology, and in environments in which hardware 102 lacks a physical NUMA topology.

Based on operation of guest allocator 113 and NUMA manager 114, in FIG. 1, guest partition 110a is shown as comprising a guest OS 115 and application(s) 118 executing thereon. Additionally, in FIG. 1, guest partition 110a is shown as being presented, by hypervisor 108, with a NUMA topology comprising a plurality of virtual NUMA nodes 119 (e.g., NUMA node 119a to NUMA node 119n). In FIG. 1, virtual NUMA nodes 119 include a vNUMA node, illustrated as NUMA node 119a, which includes both virtual processor(s) (VPs) 120 (VPs 120; e.g., a virtual compute resource) and memory 121a (e.g., a virtual memory resource). In some embodiments, virtual NUMA nodes 119 include a plurality of vNUMA nodes, including NUMA node 119a. In FIG. 1, virtual NUMA nodes 119 also include a zNUMA node, illustrated as NUMA node 119n, which includes a virtual memory resource (memory 121n) while lacking any virtual compute resource. In some embodiments, virtual NUMA nodes 119 include a plurality of zNUMA nodes, including NUMA node 119n.

In FIG. 1, guest OS 115 is illustrated as including a memory allocator 116. Like most contemporary OSs, guest OS 115 is NUMA-aware and, thus, memory allocator 116 is shown as including a NUMA component 117. Thus, when making memory allocations, memory allocator 116 considers (via NUMA component 117) a NUMA topology on which guest OS 115 operates, which includes virtual NUMA nodes 119. This means that, when making memory allocations, memory allocator 116 funnels memory accesses towards vNUMA node(s) (e.g., NUMA node 119a), rather than zNUMA node(s) (e.g., NUMA node 119n). This is because, by virtue of NUMA component 117, memory allocator 116 sees the vNUMA node(s) as comprising local memory (e.g., which generally has a lower latency cost compared to a latency cost of remote memory), while it sees the zNUMA node(s) as comprising remote memory (e.g., which generally has a greater latency cost compared to a latency cost of local memory).

In a first memory allocation embodiment, guest allocator 113 maps portion(s) of memory 104 to vNUMA node memory resources (e.g., memory 121a) during creation of the vNUMA node, but defers mappings of portion(s) of memory 104 to zNUMA node memory resources (e.g., memory 121n) until there is actually an access by guest partition 110a to a GPA corresponding to zNUMA node memory resource (e.g., memory 121n). Thus, in this first memory allocation embodiment, when memory allocator 116 funnels memory accesses towards a vNUMA node (e.g., NUMA node 119a), rather than a zNUMA node (e.g., NUMA node 119n), memory allocator 116 funnels memory accesses towards GPAs that have already been mapped to host memory.

In some embodiments, a VM host node includes a plurality of memory types, including a preferred memory type (e.g., higher-bandwidth and/or lower-latency memory such as PCIe-attached memory) and a less preferred memory type (e.g., lower-bandwidth and/or higher-latency memory such as CXL-attached memory). Thus, in FIG. 1, memory 104 is shown as including a plurality of types of memory 104 (e.g., memory type 104a to memory type 104n). In FIG. 1, memory type 104a represents a preferred memory type, while memory type 104n represents a less preferred memory type. Additionally, while memory 104 is local to computer system 101, computer architecture 100 may also include a memory 123 that is remote from computer system 101.

In a second memory allocation embodiment, guest allocator 113 maps preferred memory to vNUMA node memory resources (e.g., memory 121a), but maps less preferred memory to zNUMA node memory resources (e.g., memory 121n). For example, in FIG. 1, an arrow that connects memory 121a and memory type 104a indicates that, in embodiments, memory 121a is mapped (e.g., by guest allocator 113) to local memory and/or a preferred memory type. Additionally, in FIG. 1, an arrow that connects memory 121n and memory type 104n, and an arrow that connects memory 121n and memory 123, indicate that, in embodiments, memory 121n is mapped (e.g., by guest allocator 113) to remote memory and/or a less preferred memory type. Thus, in this second memory allocation embodiment, when memory allocator 116 funnels memory accesses towards a vNUMA node (e.g., NUMA node 119a), rather than a zNUMA node (e.g., NUMA node 119n), memory allocator 116 funnels memory accesses towards GPAs corresponding to preferred memory (e.g., based on memory location and/or memory type).

Notably, the first and second memory allocation embodiments can be combined. For example, guest allocator 113 may map preferred memory to vNUMA node memory resources (e.g., memory 121a) during creation of the vNUMA node (e.g., NUMA node 119a), while mapping less preferred memory to a zNUMA node memory resource (e.g., memory 121n) when there is actually an access by guest partition 110a to a GPA corresponding to that zNUMA node memory resource.

Figure 2:
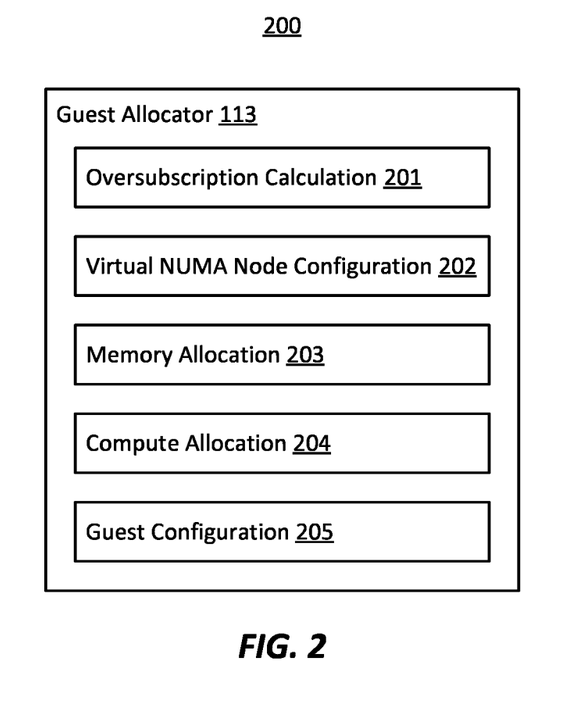
FIG. 2 illustrates an example of internal components of a guest allocator.

FIG. 2 illustrates an example 200 of internal components of guest allocator 113. Each internal component of guest allocator 113 depicted in FIG. 2 represents various functionalities that guest allocator 113 might implement in accordance with various embodiments described herein. It will be appreciated, however, that the depicted components—including their identity and arrangement—are presented merely as an aid in describing example embodiments of guest allocator 113.

In example 200, guest allocator 113 includes an oversubscription calculation component 201 (referred to hereinafter as oversubscription component 201). In embodiments, oversubscription component 201 calculates a memory oversubscription threshold for a VM. In embodiments, the memory oversubscription threshold could be percentage-based (e.g., a percentage of memory that will be physically allocated to the VM, and a percentage of memory that will be oversubscribed), or the memory oversubscription threshold could be sized-based (e.g., a size of memory that will be physically allocated to the VM, with any remaining memory being oversubscribed). Based on that memory oversubscription threshold, oversubscription component 201 also determines a first memory size to be allocated to a guest partition corresponding to the VM, and a second memory size to be oversubscribed to the guest partition. In some embodiments, oversubscription component 201 also determines a type of memory to be allocated to the guest partition (e.g., local memory, a preferred memory type), and a type of memory to be oversubscribed to the guest partition (e.g., remote memory, a less preferred memory type). Additionally, or alternatively, in some embodiments, oversubscription component 201 also determines the manner of allocation of memory, such as whether any memory should be physically allocated as part of NUMA node creation and/or guest partition instantiation, and whether physical allocation of any memory should be deferred until access by a guest partition.

Oversubscription component 201 may consider a variety of factors when calculating a memory oversubscription threshold, the type of memory to be allocated, and/or the manner of allocation. In one example, oversubscription component 201 determines a memory oversubscription threshold based on historic memory usage by a subject VM, or by one or more related VMs (e.g., with relatedness being determined based on a tenant owning the VM; a VM type, such as OS and other software operating thereon; a region in which the VM operates; and/or a workload operated at the VM). In one embodiment, historic memory usage is determined based on reporting from a guest OS, such as reporting about memory pressure or workload metrics. In another embodiment, historic memory usage is determined based on information gathered by host OS 111, such as by observing a second-level address table (SLAT) to track memory page allocations originating from a guest partition.

In another example, oversubscription component 201 determines a memory oversubscription threshold, the type of memory to be allocated, and/or the manner of allocation based on a service level agreement (SLA) associated with a given VM. In one embodiment, oversubscription component 201 oversubscribes less memory to a VM with more strict SLA requirements than it would to a VM with less strict SLA requirements. In another embodiment, oversubscription component 201 allocates more "preferred" memory (e.g., local, a preferred memory type) to a VM with more strict SLA requirements than it would to a VM with less strict SLA requirements. In another embodiment, oversubscription component 201 pre-allocates more memory to a VM with more strict SLA requirements than it would to a VM with less strict SLA requirements. In another example, oversubscription component 201 determines a memory oversubscription threshold, the type of memory to be allocated, and/or the manner of allocation based on user preferences.

In example 200, guest allocator 113 includes a virtual NUMA node configuration component 202 (referred to hereinafter as NUMA configuration component 202). In embodiments, based on the determination(s) of oversubscription component 201, NUMA configuration component 202 uses NUMA manager 114 to configure a topology of virtual NUMA nodes (e.g., virtual NUMA nodes 119). In embodiments, this includes creating one or more vNUMA nodes (e.g., NUMA node 119a) and one or more zNUMA nodes (e.g., NUMA node 119n).

In example 200, guest allocator 113 includes a memory allocation component 203. In embodiments, memory allocation component 203 allocates physical memory (e.g., memory 104) to memory resource(s) (e.g., memory 121a) of at least the vNUMA node(s) (e.g., NUMA node 119a) configured by NUMA configuration component 202. In embodiments, memory allocation component 203 maps physical memory to a memory resource of a vNUMA node as part of creating the vNUMA node and/or as part of instantiating a guest partition to which the vNUMA node is assigned. In some embodiments, however, it is possible that memory allocation component 203 may map physical memory to a vNUMA node as part of a memory fault caused by a guest OS (e.g., guest OS 115) accessing a memory resource of that vNUMA node.

In embodiments, memory allocation component 203 also allocates physical memory (e.g., memory 104, memory 123) to memory resource(s) (e.g., memory 121n) of one or more zNUMA node(s) (e.g., NUMA node 119n) configured by NUMA configuration component 202. In embodiments, memory allocation component 203 maps physical memory to a memory resource of a zNUMA node as part of a memory fault caused by a guest OS (e.g., guest OS 115) accessing a memory resource of that zNUMA node. In some embodiments, however, it is possible that memory allocation component 203 may map physical memory to a zNUMA node as part of creating the zNUMA node and/or as part of instantiating a guest partition to which the zNUMA node is assigned.

In any case, in embodiments, memory allocation component 203 maps physical memory to virtual NUMA nodes based on determination(s) made by oversubscription component 201 (e.g., a type of memory to be allocated, and/or the manner of allocation).

In example 200, guest allocator 113 includes a compute allocation component 204. In embodiments, compute allocation component 204 allocates compute resources (e.g., from among processor(s) 103) to one or more vNUMA nodes (e.g., VP(s) 120 of NUMA node 119a) as part of creating the vNUMA node and/or as part of instantiating a guest partition to which the vNUMA node is assigned. In embodiments, compute allocation component 204 does not allocate any compute resources to zNUMA nodes (e.g., NUMA node 119n).

In example 200, guest allocator 113 includes a guest configuration component 205. In embodiments, guest configuration component 205 creates and/or reconfigures a guest partition (e.g., guest partition 110a) based on the NUMA topology created by the NUMA configuration component 202. In general, this means configuring a guest partition to use at least one vNUMA node and at least one zNUMA node. In some embodiments, the guest configuration component 205 creates a new guest partition. In other embodiments, the guest configuration component 205 reconfigures an existing guest partition, and initiates a restart of a VM corresponding to that guest partition to that the VM will use a newly-configured NUMA topology. In yet other embodiments, the guest configuration component 205 reconfigures an existing guest partition, and initiates a runtime application of newly-configured NUMA topology to a VM corresponding to that guest partition, such as by using runtime update technologies (e.g., hot-pluggable memory).

Based on a configuration of virtual NUMA nodes 119, and guest OS 115 generally funnels memory accesses towards vNUMA nodes (e.g., NUMA node 119a), and away from zNUMA nodes (e.g., NUMA node 119n), due to vNUMA node(s) having lower expected access latencies than zNUMA node(s). In some embodiments, the NUMA configuration component 202 additionally assigns an artificial latency cost one or more virtual NUMA nodes, to further direct the guest OS 115 to prefer one virtual NUMA node (or set of virtual NUMA nodes) over another one virtual NUMA node (or set of virtual NUMA nodes). In embodiments, the NUMA configuration component 202 assigns an artificial latency cost to a given virtual NUMA node configuring how that virtual NUMA node presents its memory configuration (e.g., memory locality, memory type) to the guest OS 115.

Figure 3:
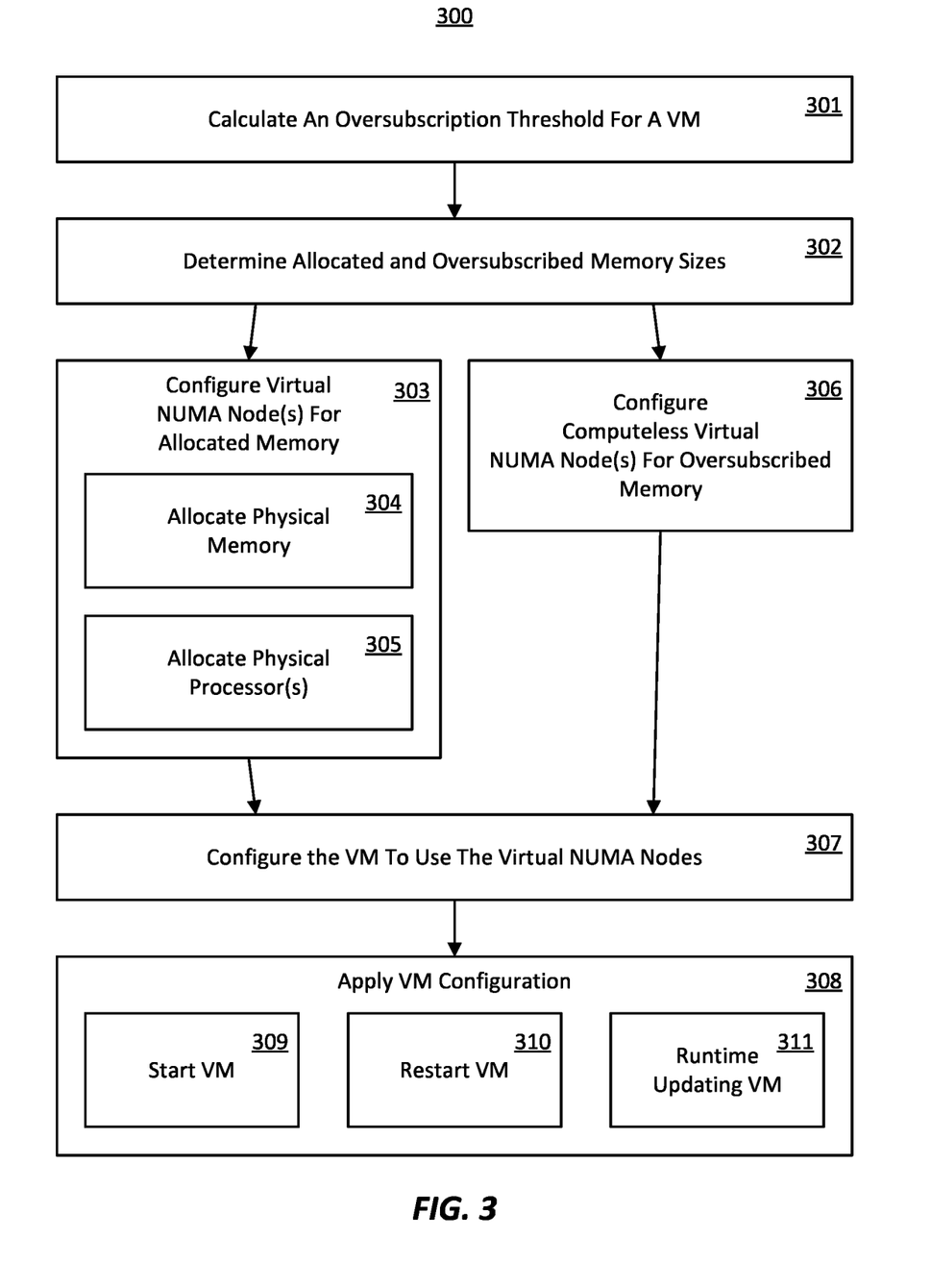
FIG. 3 illustrates a flow chart of an example method for allocating memory to a VM using virtual NUMA nodes.

Operation of computer architecture 100 is now described further in connection with FIG. 3, which illustrates a flow chart of an example method 300 for allocating memory to a VM using virtual NUMA nodes. In embodiments, instructions for implementing method 300 are encoded as computer-executable instructions (e.g., guest allocator 113) stored on a computer storage media (e.g., storage media 105) that are executable by a processor (e.g., processor(s) 103) to cause a computer system (e.g., computer system 101) to perform method 300.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 3, in embodiments, method 300 comprises an act 301 of calculating an oversubscription threshold for a VM. In some embodiments, act 301 comprises calculating a memory oversubscription threshold for a VM. In an example, oversubscription component 201 calculates a memory oversubscription threshold for guest partition 110a, which corresponds to a subject VM. As discussed, the memory oversubscription threshold could be percentage-based (e.g., 60% of the VM's memory will be physically allocated, and 40% of the VM's memory will be oversubscribed), or the memory oversubscription threshold could be sized-based (e.g., 4 GiB of the VM's memory will be physically allocated, any remaining memory will be oversubscribed).

As discussed, oversubscription component 201 may consider a variety of factors when calculating a memory oversubscription threshold, such as a historic memory usage metric (e.g., of a related VM), SLA, and/or user preference. Thus, in some embodiments, the memory oversubscription threshold is calculated in act 301 based on at least one of an SLA associated with the VM, a memory metric obtained from a related VM, or a user preference. For example, a historic memory usage metric could be a memory pressure metric and/or a memory page allocation metric. Thus, in some embodiments of act 301, calculating the memory oversubscription threshold considers the memory metric obtained from the related VM, and the memory metric comprises at least one of a memory pressure metric or a memory page allocation metric.

Method 300 also comprises an act 302 of determining allocated and oversubscribed memory sizes. In some embodiments, act 302 comprises, based on the memory oversubscription threshold, determining (1) a first memory size to be physically allocated to the VM, and (2) a second memory size to be oversubscribed to the VM. In an example, based on a percentage-based metric or a sized-based metric, oversubscription component 201 determines an amount of memory to be allocated to guest partition 110a, and an amount of memory to be oversubscribed for guest partition 110a.

After act 302, method 300 proceeds to an act 303 of configuring virtual NUMA node(s) for allocated memory, and an act 306 of configuring computeless virtual NUMA node(s) for oversubscribed memory. No ordering is specified between act 303 and act 306. Thus, these acts could be performed serially (in either order), or in parallel.

Referring to act 303, in some embodiments, act 303 comprises configuring a first virtual NUMA node comprising a VP and a first virtual memory having the first memory size. In an example, configuration component 202 creates NUMA node 119a (e.g., a vNUMA node), which includes VP(s) 120 and memory 121a. As shown, act 303 can include an act 304 of allocating physical memory, and an act 305 of allocating physical processor(s). No particular ordering is required among act 304 and act 305. Thus, these acts could be performed serially (in either order), or in parallel. In some embodiments, act 304 comprises allocating a first physical memory to back the first virtual memory. In an example, memory allocation component 203 maps a portion of memory 104 to memory 121a of NUMA node 119a. In embodiments, allocating the first physical memory to back the first virtual memory comprises allocating a first physical memory to back an entirety of the first virtual memory (e.g., an entirety of memory 121a of NUMA node 119a). In some embodiments, act 305 comprises allocating a physical processing resource to back the VP. In an example, compute allocation component 204 maps a portion of processor(s) 103 to VP(s) 120 of NUMA node 119a.

Referring to act 306, in some embodiments, act 306 comprises configuring a second virtual NUMA node comprising a second virtual memory having the second memory size, the second virtual NUMA node being a computeless NUMA node (e.g., a NUMA node that lacks any VP). In an example, configuration component 202 creates NUMA node 119n (e.g., a zNUMA node), which includes memory 121a, but which lacks any VP.

As discussed, in some embodiments, no physical memory is allocated to zNUMA nodes during instantiation (e.g., instantiation of the zNUMA node, instantiation of the corresponding guest partition). Thus, in some embodiments of act 306, the second virtual memory lacks any physical memory mapping. However, there could be embodiments in which physical memory is allocated to a zNUMA node during instantiation, such that act 306 further comprises allocating a second physical memory to back the second virtual memory.

Referring to FIG. 3, in embodiments, method 300 comprises an act 307 of configuring the VM to use the virtual NUMA nodes. In some embodiments, act 307 comprises configuring the VM to use the first virtual NUMA node and the second virtual NUMA node. In an example, guest configuration component 205 configures guest partition 110a to use both NUMA node 119a (e.g., a vNUMA node) and NUMA node 119n (e.g., a zNUMA node).

Method 300 also comprises an act 308 of applying a VM configuration. In some embodiments, act 308 comprises at least one of starting the VM (e.g., act 309), restarting the VM (e.g., act 310), or initiating a runtime update of the VM (e.g., act 311). In an example, guest configuration component 205 starts the VM, restarts the VM, or initiates a runtime update of the VM.

Based on operation of method 300, in embodiments a guest OS at the VM prefers to send memory accesses to its vNUMA node(s) over its zNUMA node(s). Thus, based on operation of method 300, a guest OS funnels memory accesses to the "preferred" GPAs in favor of the "less preferred" GPAs. As such, in some embodiments, based on the first virtual NUMA node comprising the VP and on the second virtual NUMA node being a computeless NUMA node, a guest OS at the VM funnels a memory access to the first virtual memory (e.g., instead of the second virtual memory). For example, based on NUMA component 117, memory allocator 116 prefers to send memory accesses to GPAs corresponding to memory 121$a$, rather than GPAs corresponding to memory 121$n$. Thus, based on operation of method 300, costly memory faults that occur when accessing GPAs corresponding to oversubscribed memory are avoided, even in the presence of an unenlightened guest OS.

Although, after act 306, the second virtual memory of the second virtual NUMA node (e.g., NUMA node 119$n$) may lack any physical memory mapping, method 300 can include mapping to physical memory to the second virtual NUMA node. Thus, in embodiments, method 300 may further comprise allocating a second physical memory to back the second virtual memory. In an embodiment, this allocation is based on the VM accessing a GPA corresponding to the second virtual memory of the second virtual NUMA node. Thus, in embodiments, allocating the second physical memory to back the second virtual memory is triggered by an access by a guest OS at the VM to the second virtual memory.

Regardless of whether the second physical memory is mapped to the second virtual NUMA node (e.g., a zNUMA node) at instantiation, or based on a subsequent memory access, in some embodiments, this second physical memory is "less preferred" than the first physical memory mapped to the first virtual NUMA node (e.g., a vNUMA node). Thus, for example, in embodiments the second physical memory has a higher latency of access than the first physical memory and/or the second physical memory is remote from the computer system.

As mentioned, in some embodiments the NUMA configuration component 202 additionally assigns an artificial latency cost one or more virtual NUMA nodes, to further direct the guest OS 115 to prefer one virtual NUMA node (or set of virtual NUMA nodes) over another one virtual NUMA node (or set of virtual NUMA nodes). For example, the NUMA configuration component 202 may assign an artificial latency cost to the first virtual NUMA node to further distinguish its latency from a latency of the second virtual NUMA node (or vice versa), the NUMA configuration component 202 may assign an artificial latency cost to a third virtual NUMA node that is configured as a vNUMA node to distinguish its latency from a latency of the first virtual NUMA node, and/or the NUMA configuration component 202 may assign an artificial latency cost to a fourth virtual NUMA node that is configured as a zNUMA node to distinguish its latency from a latency of the second virtual NUMA node. Thus, in some embodiments, method 300 also comprises assigning an artificial latency cost to at least one virtual NUMA node, such as at least one of the first virtual NUMA node or the second virtual NUMA node.

Embodiments of the disclosure may comprise or utilize a special-purpose or general-purpose computer system (e.g., computer system 101) that includes computer hardware, such as, for example, a processor system (e.g., processor(s) 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, comprising:
    calculating a memory oversubscription threshold for a virtual machine (VM);
    based on the memory oversubscription threshold, determining (1) a first memory size to be physically allocated to the VM, and (2) a second memory size to be oversubscribed to the VM;
    configuring a first virtual non-uniform memory access (NUMA) node comprising a virtual processor (VP) and a first virtual memory having the first memory size, the configuring the first virtual NUMA node including allocating a first physical memory to back the first virtual memory;
    configuring a second virtual NUMA node comprising a second virtual memory having the second memory size, the second virtual NUMA node being a computeless NUMA node; and
    configuring the VM to use the first virtual NUMA node and the second virtual NUMA node.

2. The method of claim 1, wherein, based on the first virtual NUMA node comprising the VP and on the second virtual NUMA node being a computeless NUMA node, a guest operating system at the VM funnels a memory access to the first virtual memory.

3. The method of claim 1, wherein the memory oversubscription threshold is calculated based on at least one of:
    a service level agreement associated with the VM;
    a memory metric obtained from a related VM; or
    a user preference.

4. The method of claim 3, wherein calculating the memory oversubscription threshold considers the memory metric obtained from the related VM, and wherein the memory metric comprises at least one of a memory pressure metric or a memory page allocation metric.

5. The method of claim 1, wherein the second virtual memory lacks any physical memory mapping.

6. The method of claim 1, further comprising allocating a second physical memory to back the second virtual memory.

7. The method of claim 6, wherein the second physical memory has a higher latency of access than the first physical memory.

8. The method of claim 6, wherein the second physical memory is remote from the computer system.

9. The method of claim 6, wherein allocating the second physical memory to back the second virtual memory is triggered by an access by a guest operating system at the VM to the second virtual memory.

10. The method of claim 1, further comprising at least one of:
   starting the VM;
   restarting the VM; or
   initiating a runtime update of the VM.

11. The method of claim 1, further comprising assigning an artificial latency cost to the first virtual NUMA node or the second virtual NUMA node.

12. A computer system, comprising:
   a processing system; and
   a computer storage media that stores computer-executable instructions that are executable by the processing system to at least:
      determine, based on a memory oversubscription threshold for a virtual machine (VM), (1) a first memory size to be physically allocated to the VM, and (2) a second memory size to be oversubscribed to the VM;
      configure a first virtual non-uniform memory access (NUMA) node comprising a virtual processor (VP) and a first virtual memory having the first memory size, the configuring the first virtual NUMA node including allocating a portion of a first physical memory to back the first virtual memory;
      configure a second virtual NUMA node comprising a second virtual memory having the second memory size, the second virtual NUMA node being a computeless NUMA node; and
      configure the VM to use the first virtual NUMA node and the second virtual NUMA node.

13. The computer system of claim 12, wherein, based on the first virtual NUMA node comprising the VP and on the second virtual NUMA node being a computeless NUMA node, a guest operating system at the VM funnels a memory access to the first virtual memory.

14. The computer system of claim 12, wherein the memory oversubscription threshold is calculated based on at least one of:
   a service level agreement associated with the VM;
   a memory metric obtained from a related VM; or
   a user preference.

15. The computer system of claim 14, wherein calculating the memory oversubscription threshold considers the memory metric obtained from the related VM, and wherein the memory metric comprises at least one of a memory pressure metric or a memory page allocation metric.

16. The computer system of claim 12, wherein the second virtual memory lacks any physical memory mapping.

17. The computer system of claim 12, the computer-executable instructions also executable by the processing system to allocate a second physical memory to back the second virtual memory.

18. The computer system of claim 17, wherein the second physical memory has a higher latency of access than the first physical memory or is remote from the computer system.

19. The computer system of claim 17, wherein allocating the second physical memory to back the second virtual memory is triggered by an access by a guest operating system at the VM to the second virtual memory.

20. A computer program product comprising a hardware storage device that stores computer-executable instructions that are executable by a processing system to at least:
   determine, based on a memory oversubscription threshold for a virtual machine (VM), (1) a first memory size to be physically allocated to the VM, and (2) a second memory size to be oversubscribed to the VM;
   configure a first virtual non-uniform memory access (NUMA) node comprising a virtual processor (VP) and a first virtual memory having the first memory size, the configuring the first virtual NUMA node including allocating a portion of the memory to back the first virtual memory;
   configure a second virtual NUMA node comprising a second virtual memory having the second memory size, the second virtual NUMA node being a computeless NUMA node, and the second virtual memory lacking any physical memory mapping; and
   configure the VM to use the first virtual NUMA node and the second virtual NUMA node.

* * * * *